United States Patent
Kira et al.

(10) Patent No.: US 9,498,859 B2
(45) Date of Patent: Nov. 22, 2016

(54) MULTI-AXIS TEMPORARY TIGHTENING TOOL

(75) Inventors: Kazuhiko Kira, Toyota (JP); Toshio Toyoda, Miyoshi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 260 days.

(21) Appl. No.: 14/128,118

(22) PCT Filed: Jun. 13, 2012

(86) PCT No.: PCT/IB2012/001139
§ 371 (c)(1),
(2), (4) Date: Dec. 20, 2013

(87) PCT Pub. No.: WO2012/176032
PCT Pub. Date: Dec. 27, 2012

(65) Prior Publication Data
US 2014/0123815 A1    May 8, 2014

(30) Foreign Application Priority Data

Jun. 21, 2011 (JP) ................................ 2011-137760

(51) Int. Cl.
*B23P 19/06* (2006.01)

(52) U.S. Cl.
CPC .................................. *B23P 19/069* (2013.01)

(58) Field of Classification Search
CPC .............................. B23P 19/069; B25B 17/00
USPC ............................................. 81/57.36, 57.22
See application file for complete search history.

(56) References Cited

U.S. PATENT DOCUMENTS

| | | | | |
|---|---|---|---|---|
| 2,069,882 A * | 2/1937 | Hall | ...................... | B23P 19/069 81/57.22 |
| 2,781,682 A * | 2/1957 | Herndon | ............... | B23P 19/069 81/57.22 |
| 4,515,043 A * | 5/1985 | Gray | ..................... | B23P 19/069 81/57.22 |
| 4,569,259 A * | 2/1986 | Rubin | ................... | B25B 13/485 81/121.1 |
| 7,836,796 B2 * | 11/2010 | Chang | ..................... | B25B 17/00 81/57.22 |
| 2004/0065176 A1 | 4/2004 | Lin | | |
| 2006/0169107 A1* | 8/2006 | Taniguchi | ............. | B23P 19/069 81/57.22 |
| 2009/0038448 A1 | 2/2009 | Chang | | |
| 2011/0265611 A1 | 11/2011 | Raman | | |

FOREIGN PATENT DOCUMENTS

| | | |
|---|---|---|
| JP | 5847475 | 3/1983 |
| JP | 62137803 U | 8/1987 |
| JP | 6379176 U | 5/1988 |
| JP | 7-40043 U | 7/1995 |

(Continued)

OTHER PUBLICATIONS

Ref NPL Partial English Translation of Communication dated May 5, 2015, issued by the State Intellectual Property Office of the People's Republic of China in counterpart Application No. 2012800307080.

*Primary Examiner* — Hadi Shakeri
(74) *Attorney, Agent, or Firm* — Sughrue Mion, PLLC

(57) ABSTRACT

A multi-axis temporary tightening tool includes: a tool main body formed into a ring shape; and a plurality of sockets which are arranged in a ring shape along the tool main body, are rotated by rotational force input to the tool main body, and simultaneously apply rotational force to a plurality of screw members that are engaged in the sockets.

3 Claims, 16 Drawing Sheets

(56) References Cited

FOREIGN PATENT DOCUMENTS

| JP | 08-187629 A | 7/1996 |
| JP | 2001-113422 A | 4/2001 |
| JP | 2004-106076 A | 4/2004 |
| JP | 2006-205274 A | 8/2006 |

* cited by examiner

MULTI-AXIS TEMPORARY TIGHTENING TOOL

BACKGROUND OF THE INVENTION

1. Field of the Invention

The present invention relates to a technology of a multi-axis temporary tightening tool which is a rotating tool for simultaneously tightening a plurality of screw members.

2. Description of Related Art

In cases such as of fastening a tire wheel to a hub with a plurality of nuts, a workpiece to attach may be fixed with a plurality of screw members (bolts, nuts, or the like) to a portion to which the workpiece is attached. For example, in an operation where the wheel is fixed to the hub with the nuts, when the nuts are tightened, generally, an operating personnel first manually tightens the nuts one by one for several threads on stud bolts implanted in the hub. The personnel then fully tightens the nuts at a prescribed torque using a tool such as a torque wrench. Hereinafter in this description, screwing a screw member such as nut or bolt for several threads to a member such as stud bolt or nut to which the screw member is screwed before fully tightening will be referred to as "temporary tightening".

However, temporary tightening of the screw members which is manually made one by one by the operating personnel takes time and is troublesome. Therefore, for an efficient temporary tightening operation, a tool (so-called a multi-axis temporary tightening tool) has been developed which is capable of simultaneous temporary tightening of a plurality of screw members. For example, Japanese Patent Application Publication No. 2006-205274 (JP 2006-205274 A) which will be described below discloses such a technology, which has been known. "Multi-axis temporary tightening tool" described herein is a tool suitable for the use in simultaneous "temporary tightening" of a plurality of screw members (bolts, nuts, or the like). Its use is not limited to the temporary tightening of a plurality of screw members. For example, when torque controlling is not very necessary, the tool can be used for simultaneously fully tightening a plurality of screw members or can be used for simultaneously loosening a plurality of screw members that have been already tightened or for other purposes.

The multi-axis temporary tightening tool according to the conventional technology disclosed in JP 2006-205274 A has a driving gear which is rotated by a driving means, a plurality of driven gears, a toothed belt which is wound around the driving gear and the plurality of driven gears and transmits rotation of the driving gear to the plurality of driven gears, and a plurality of sockets which are coupled to the plurality of driven gears and are engaged with bolts or nuts. The driving gear is placed in a central portion of a main body of the multi-axis temporary tightening tool. The pluralities of driven gears and sockets are placed around the driving gear in the main body. In such a configuration, rotational force is input to the driving gear, and the plurality of sockets can be thereby simultaneously rotated, thus enabling simultaneous temporary tightening of the plurality of bolts and nuts.

The multi-axis temporary tightening tool according to the conventional technology disclosed in JP 2006-205274 A has a problem such that for example, in the case that the stud bolts on which the screw members are screwed are placed to surround a protruding portion, the main body of the multi-axis temporary tightening tool may interfere with the protruding portion, and thus the multi-axis temporary tightening tool cannot be used depending on the arrangement of the stud bolts. Even in such a case, the sockets are made longer than the height of the protruding portion, thereby allowing prevention of the interference between the main body of the tool and the protruding portion. However, the longer sockets result in problems such as size increase of the multi-axis temporary tightening tool and difficulty in handling of the tool.

SUMMARY OF THE INVENTION

The present invention provides a multi-axis temporary tightening tool which can be used regardless of arrangement of members on which screw members are screwed in a workpiece to attach and the shape of the workpiece around the members on which the screw members are screwed and which is highly handleable.

A multi-axis temporary tightening tool according to an embodiment of the present invention includes: a tool main body formed into a ring shape; and a plurality of sockets which are arranged in a ring shape along the tool main body, are rotated by rotational force input to the tool main body, and simultaneously apply rotational force to a plurality of screw members that are engaged in the sockets.

In the embodiment, even if stud bolts to which the screw members are tightened are arranged around a protruding portion, the multi-axis temporary tightening tool can be applied.

The socket may include: a roller that is a portion to which the rotational force is input from the tool main body; a rotational shaft that supports the roller; an engagement portion which is formed of a magnetic material and engages with the screw member supported by one end of the rotational shaft; and a magnet which is placed to abut upon the engagement portion and has magnetically holding force.

In the embodiment, the screw members can be certainly held.

The socket may include a positioning portion which is formed at the one end of the rotational shaft, protrudes from the engagement portion, positions the screw member, and is formed of a non-magnetic material.

The embodiment allows reduction in the operational force required when the multi-axis temporary tightening tool is removed from a workpiece after the temporary tightening.

The tool main body may include a support ring that rotatably supports the rotational shafts and a rotating ring that is rotatably supported by the support ring. The rollers may rotatably support the rotational shafts while the rollers are coupled to the rotating ring. Rotation of the rotating ring may be transmitted to the rollers, and the rotational shafts may thereby rotate.

The embodiment enables a construction of the multi-axis temporary tightening tool having a ring shape with a simple mechanism.

A surface of the rotating ring which is coupled to the rollers may be formed to incline with respect to an axial direction of the rotating ring, and surfaces of the rollers which are coupled to the rotating ring may be formed to incline with respect to an axial direction of the rollers. Inclination angles of the surfaces of the rollers which are coupled to the rotating ring may be generally the same angles as an inclination angle of the surface of the rotating ring which is coupled to the rollers.

In the embodiment, the operational force of the rotating ring can be certainly transmitted to the rollers, thus allowing a simple and operable construction of the multi-axis temporary tightening tool.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 1A and 1B are schematic diagrams of an assembly and a workpiece to which a multi-axis temporary tightening tool according to an embodiment of the present invention is applied, in which FIG. 1A is a perspective schematic diagram that illustrates an assembled state of the assembly and the workpiece, and FIG. 1B is a partial perspective schematic diagram that illustrates arrangement of nuts which are screw members and stud bolts which are members on which the screw members are screwed around the workpiece;

FIGS. 8A and 8B are schematic diagrams illustrating the multi-axis temporary tightening tool according to another embodiment of the present invention, in which FIG. 8A is a plan schematic diagram and FIG. 8B is a side schematic diagram;

FIGS. 10A and 10B are schematic diagrams illustrating an engaged state of the nut in an engagement portion in the arrangement of the multi-axis temporary tightening tool in the prescribed position, in which FIG. 10A is a side cross-sectional schematic diagram and FIG. 10B is a plan schematic diagram;

FIGS. 11A and 11B illustrate a state where rotational force of a rotating ring is transmitted to the rotating rollers, in which FIG. 11A is a side partial schematic diagram and FIG. 11B is a plan schematic diagram;

FIGS. 12A and 12B are schematic diagrams illustrating an engaged state of the nut in an engagement portion during reverse rotation of the rotating ring, in which FIG. 12A is a side cross-sectional schematic diagram and FIG. 12B is a plan schematic diagram;

DETAILED DESCRIPTION OF EMBODIMENTS

Figure 1A:
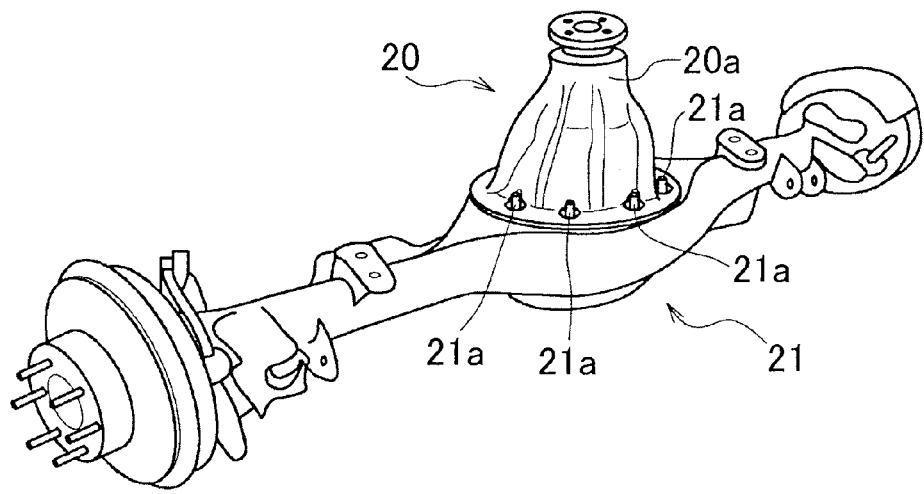

Embodiments of the present invention will be next described. First of all, a general configuration of a multi-axis temporary tightening tool according to an embodiment of the present invention will be described with reference to FIGS. 1 to 7. The multi-axis temporary tightening tool according to the embodiment of the present invention is a tool used for "temporarily tightening" a plurality of screw members (a plurality of nuts 22 in this embodiment) to stud bolts 21a (see FIGS. 1A and 1B) that are a plurality of members on which the screw members are screwed provided in an assembly 21 when in an operation as shown in FIG. 1A for assembling the assembly 21 of a rear axle, a differential carrier (hereinafter referred to as "workpiece 20") is attached to the assembly 21.

Figure 1B:
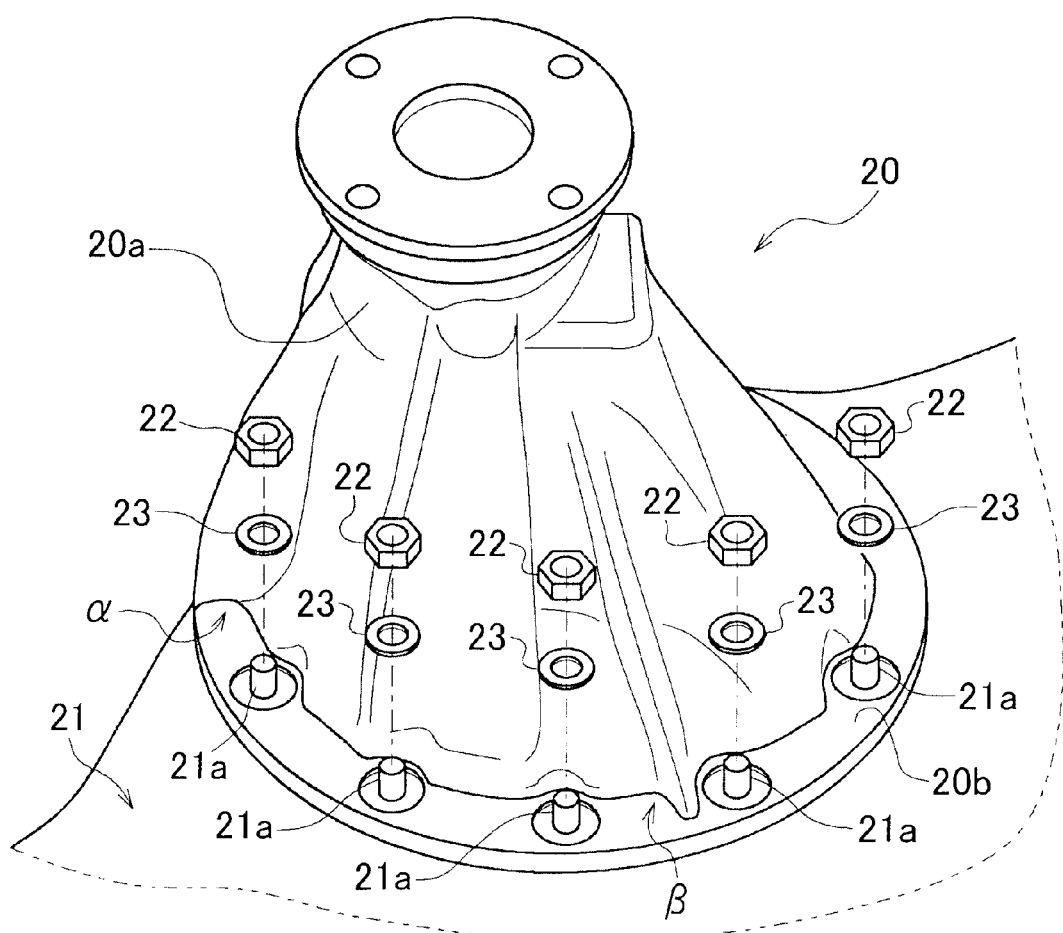
Figure 2:
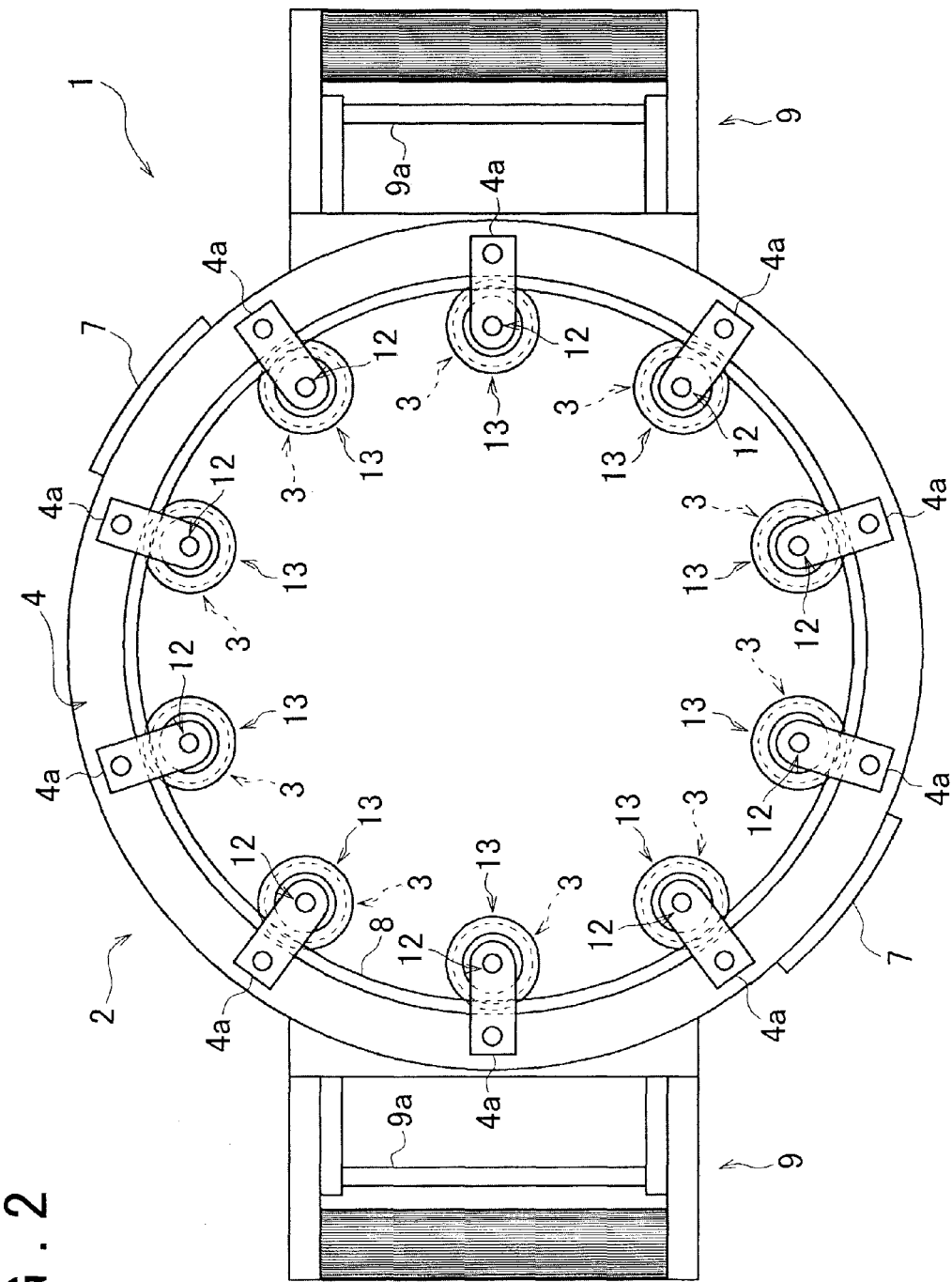
FIG. 2 is a plan schematic diagram that illustrates a general construction of the multi-axis temporary tightening tool according to the embodiment of the present invention.
Figure 3:
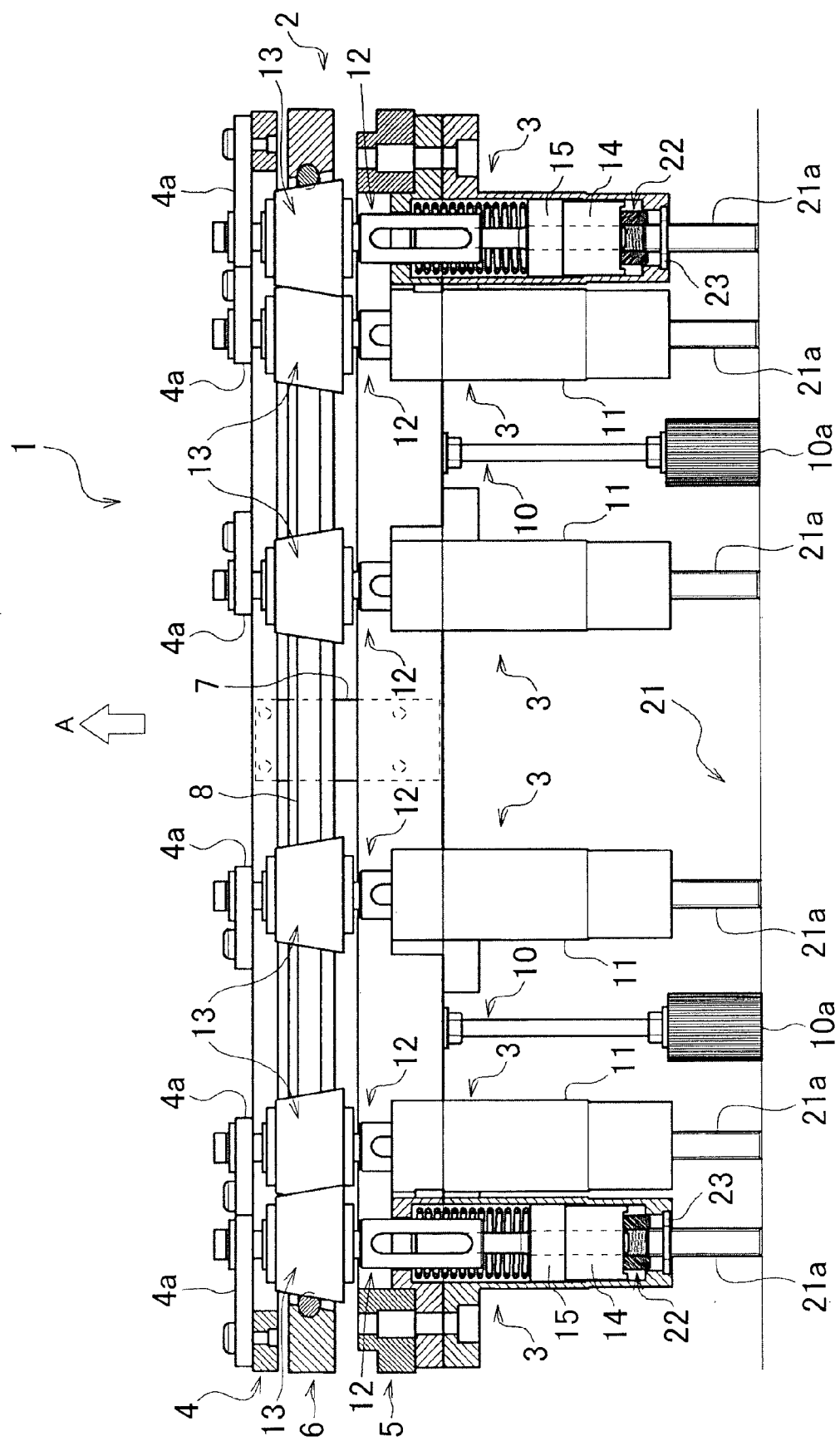
FIG. 3 is a side cross-sectional schematic diagram that illustrates the multi-axis temporary tightening tool according to the embodiment of the present invention.

As shown in FIGS. 2 and 3, a multi-axis temporary tightening tool 1 according to the embodiment of the present invention is a tool that is capable of placing nuts 22 and washers 23 (see FIG. 1B) for the plurality of stud bolts 21a and of simultaneous temporary tightening of the nuts 22 on the respective stud bolts 21a and includes a main body 2, a plurality of sockets 3, and so forth. In this description, an example will be described where the multi-axis temporary tightening tool 1 is used under a condition such that the direction of arrow A indicated in FIG. 3 is the vertical direction, in a state in which the assembly 21 is placed to protrude upward in the vertical direction, the axial direction of each of the sockets 3 of the multi-axis temporary tightening tool 1 is directed in the vertical direction, and the axes of the stud bolts 21a generally correspond to the axes of the respective sockets 3.

The main body 2 is a portion through which the multi-axis temporary tightening tool 1 inputs rotational force to each of the nuts 22 and which supports each of the sockets 3 that output rotational force to be applied to each of the nuts 22. In the use state of the multi-axis temporary tightening tool 1, the main body 2 includes a support ring 4 (hereinafter referred to as "upper support ring 4") which is a generally ring-shaped member placed on an upper side of the main body 2, a support ring 5 (hereinafter referred to as "lower support ring 5") which is a generally ring-shaped member placed on a lower side of the main body 2, and a rotating ring 6 which is a ring-shaped member interposed between the support rings 4 and 5.

Figure 4:
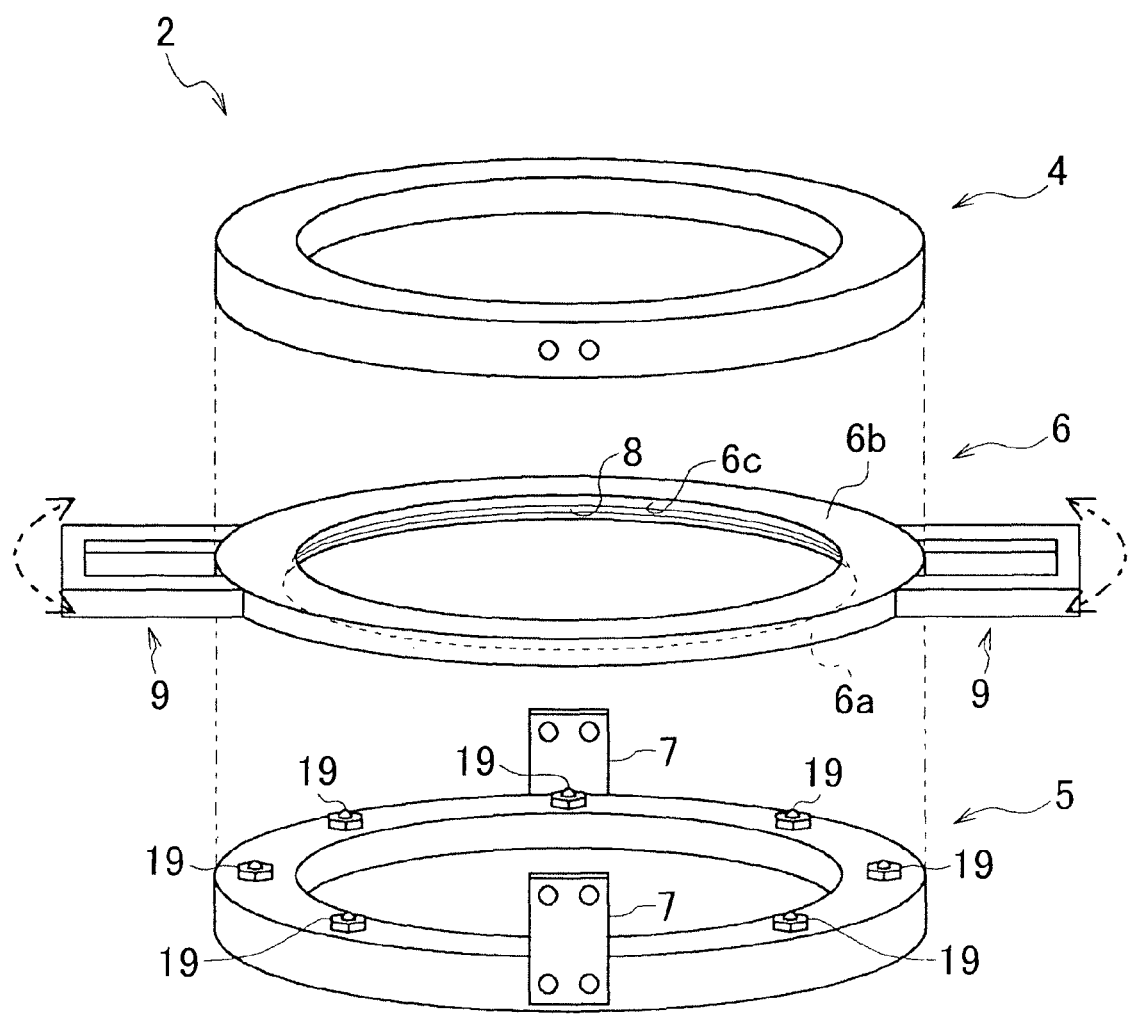
FIG. 4 is an exploded perspective schematic diagram that illustrates a main body constructing the multi-axis temporary tightening tool.

As shown in FIG. 4, the upper support ring 4 and the lower support ring 5 are coupled together by a coupling plate 7 such that they keep parallel to each other at a prescribed interval. Furthermore, in the use state of the multi-axis temporary tightening tool 1, the upper support ring 4 and the lower support ring 5 are kept generally horizontal. The rotating ring 6 is placed between the upper support ring 4 and the lower support ring 5 that are coupled together.

As described above, in the multi-axis temporary tightening tool 1, the main body 2 is configured with the upper support ring 4, the lower support ring 5, and the rotating ring 6 that are all ring-shaped. This secures a cavity in a central portion of the main body 2, thus allowing insertion (entrance) of a protrusion 20a (see FIGS. 1A and 1B) of the workpiece 20 in the cavity of the main body 2.

Figure 5:
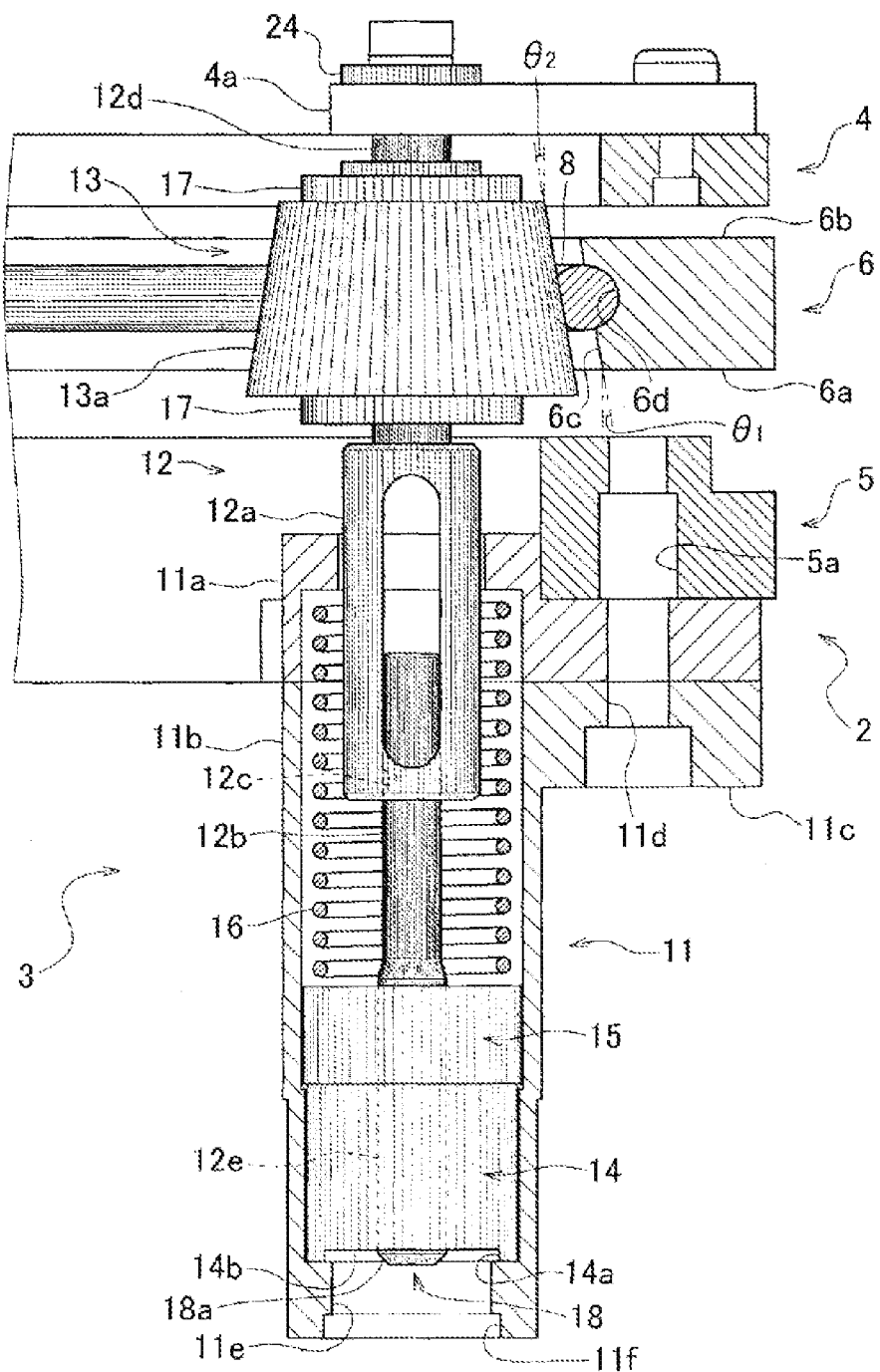
FIG. 5 is a side cross-sectional schematic diagram that illustrates a socket constructing the multi-axis temporary tightening tool.

As shown in FIGS. 3 and 5, the rotating ring 6 has a lower surface 6a and an upper surface 6b that have the same outer diameters, is a generally ring-shaped member in which an inner diameter of the lower surface 6a is larger compared to an inner diameter of the upper surface 6b, and includes an inclined surface 6c such that on the inside of the rotating ring 6, an inner diameter of the rotating ring 6 increases from the upper surface 6b-side to the lower surface 6a-side.

A groove 6d which is a groove-shaped recess into which a rubber ring 8 is fitted is formed in the inclined surface 6c. The rubber ring 8 fitted into the groove 6d swells out from the inclined surface 6c. In this embodiment, the upper support ring 4, the lower support ring 5, and the rotating ring 6 are formed of resin for securing rigidity of the multi-axis temporary tightening tool 1 and for facilitating weight reduction of the multi-axis temporary tightening tool 1.

As shown in FIG. 4, the rotating ring 6 is interposed between the upper support ring 4 and the lower support ring 5 and held between the upper support ring 4 and the lower support ring 5. In the multi-axis temporary tightening tool 1 according to the embodiment of the present invention, a plurality of ball rollers 19 are disposed on an upper surface of the lower support ring 5. Accordingly, each of the ball rollers 19 can receive downward stress produced when the rotating ring 6 is rotated by an operating personnel, thus allowing smooth rotation of the rotating ring 6.

As shown in FIGS. 2 and 4, the rotating ring 6 has a pair of handlebars 9 which serve as operating portions when the operating personnel operates and rotates the rotating ring 6. In the use state of the multi-axis temporary tightening tool 1, the operating personnel grips the handlebars 9 to move the handlebars 9 in a desired rotational direction and thereby can rotate the rotating ring 6 in a horizontal plane.

As shown in FIG. 2, the handlebar 9 includes a stopper 9a for fixing the rotating ring 6 to a certain rotational position. The stopper 9a includes a locking portion (not shown) that locks the lower support ring 5. While the stoppers 9a are not gripped, the locking portion locks the lower support ring 5, thereby locking the rotating ring 6 to the lower support ring 5 such that they cannot relatively rotate. When the operating personnel grips the handlebars 9 and grips on the stoppers 9a, the locking by the locking portion on the lower support ring 5 is released, thereby allowing the rotating ring 6 to rotate.

As shown in FIG. 3, a plurality of positioning stoppers 10 are provided to protrude below the main body 2. Positioning stoppers 10 are portions in the multi-axis temporary tightening tool 1 which contact with the workpiece 20 and serve to keep the separation interval between the main body 2 and the workpiece 20 depending on the protruding heights of the positioning stoppers 10 from the main body 2.

Each of the positioning stoppers 10 is placed along a portion in which the ridge shape of the protrusion 20a and a flange surface 20b in the workpiece 20 is recessed (for example, portions α, β, or the like indicated in FIG. 1B). Each of the stoppers 10 serves to position the main body 2 with respect to the workpiece 20 in a plan view. In other words, in the multi-axis temporary tightening tool 1, the positioning stoppers 10 keep a constant relative positional relationship between the stud bolts 21a and the respective sockets 3 in the use state of the multi-axis temporary tightening tool 1.

A contact portion 10a formed of resin (for example, urethane) is provided at the tip of the positioning stopper 10, which prevents damage or the like during the contact between the positioning stoppers 10 and the workpiece 20 (for example, a flange portion 20b).

The socket 3 is a portion which engages with the nut 22 which is the screw member in this embodiment and applies rotational force to the nut 22. As shown in FIG. 5, the socket 3 includes a case 11, a rotational shaft 12, a rotating roller 13, an engagement portion 14, a magnet 15, a spring 16, and so forth.

The case 11 is a member that rotatably supports the rotational shaft 12 and houses the engagement portion 14, the magnet 15, the spring 16, and so forth and is divided into a case 11a on the upper side (hereinafter referred to as "upper case 11a") and a case 11b on the lower side (hereinafter referred to as "lower case 11b").

The case 11 includes a stay 11c which is a portion that fixes the case 11 to the lower support ring 5. A bolt (not shown) is inserted into a hole 11d formed in the stay 11c, and the bolt is screwed into a nut hole 5a formed in the lower support ring 5, thereby fixing the case 11 to the lower support ring 5. An inner diameter of the case 11 generally corresponds with an outer diameter of the engagement portion 14 (however, the inner diameter of the case 11 is slightly larger than the outer diameter of the engagement portion 14 to the extent that the engagement portion 14 is capable of rotating and sliding within the case 11). An inner circumferential surface of the case 11 surrounds an outer circumferential surface of the engagement portion 14. Accordingly, the case 11 functions as a bearing that rotatably supports the engagement portion 14.

The rotational shaft 12 is a shaft member formed with two members that are an upper rotational shaft 12a which is a member on the upper side and a lower rotational shaft 12b which is a member on the lower side. The lower rotational shaft 12b is inserted into a hole 12c formed in the upper rotational shaft 12a such that they are not capable of relative rotation, but capable of relative displacement in the axial direction, thereby forming a shaft member which is capable of extending and contracting in the axial direction.

As shown in FIGS. 2, 3, and 5, in the rotational shaft 12, its upper end 12d is rotatably supported via a bearing member 24 by a stay member 4a which is provided to protrude from the upper support ring 4 inward of its ring shape. As shown in FIGS. 3 and 5, the rotational shaft 12 is rotatably supported by the case 11 via the engagement portion 14 and the magnet 15 disposed at a lower end 12e of the rotational shaft 12 such that the engagement portion 14 and the magnet 15 are rotatably supported by the case 11. Accordingly, the rotational shaft 12 is rotatably supported via the case 11 by the upper support ring 4 and the lower support ring 5 (that is, the main body 2).

Figure 6:
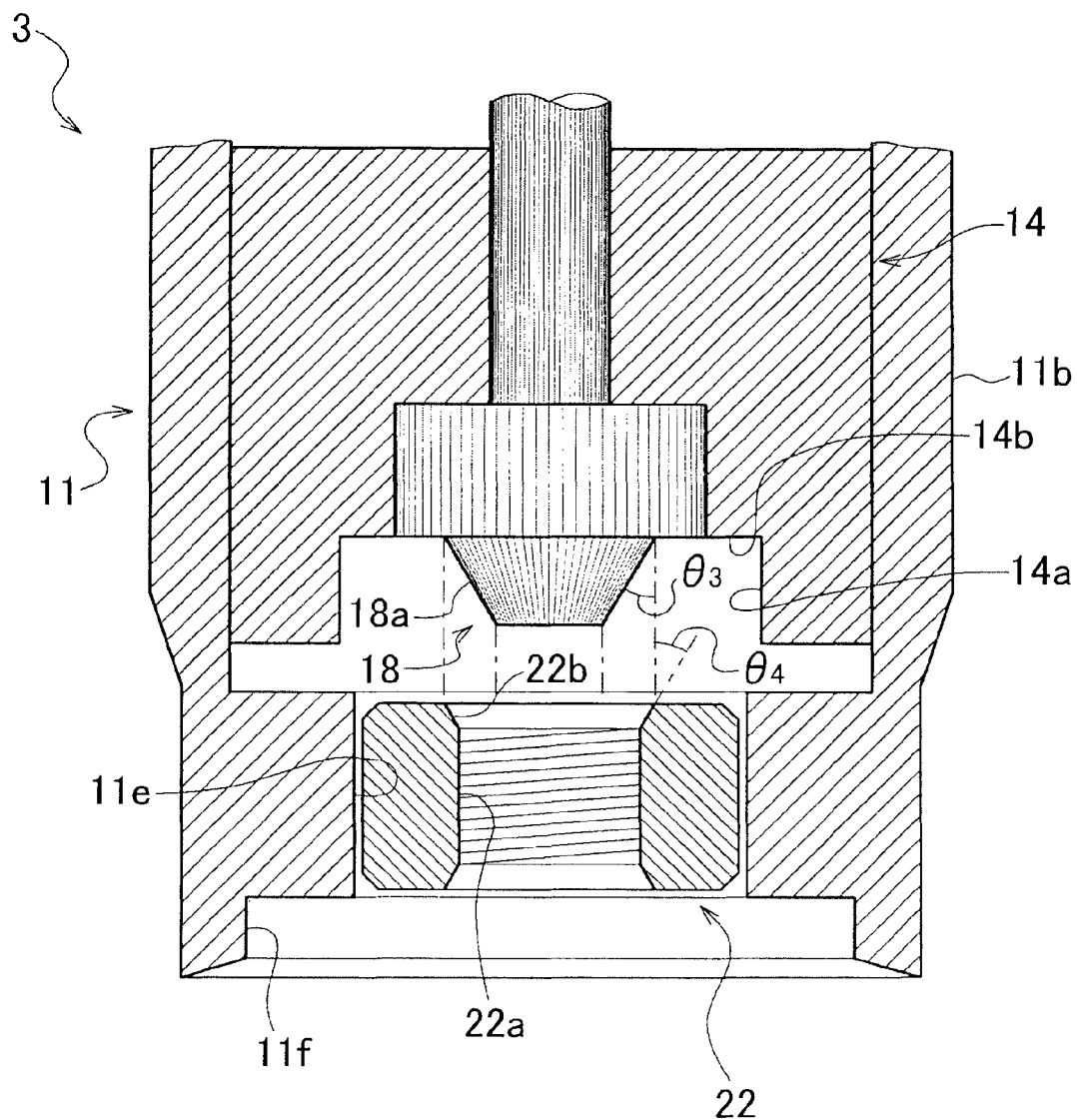
FIG. 6 is a side partial cross-sectional schematic diagram that illustrates a loaded state of the nut in the socket.

The lower rotational shaft 12b is formed with a material having no magnetism (non-magnetic material) such as aluminum and as shown in FIG. 5 forms a positioning portion 18 which is a protruding portion at the lower end 12e of the lower rotational shaft 12b. The positioning portion 18 has an inclined surface 18a formed therein as shown in FIG. 6. The diameter of a top of the positioning portion 18 is smaller compared to that of a nut hole 22a formed in the nut 22. Further, the diameter of the positioning portion 18 at its base portion is generally the same as that of the nut hole 22a formed in the nut 22. As described above, the positioning portion 18 is formed into a circular truncated cone having the inclined surface 18a which is a tapered surface whose diameter reduces as progressing downward.

Figure 7:
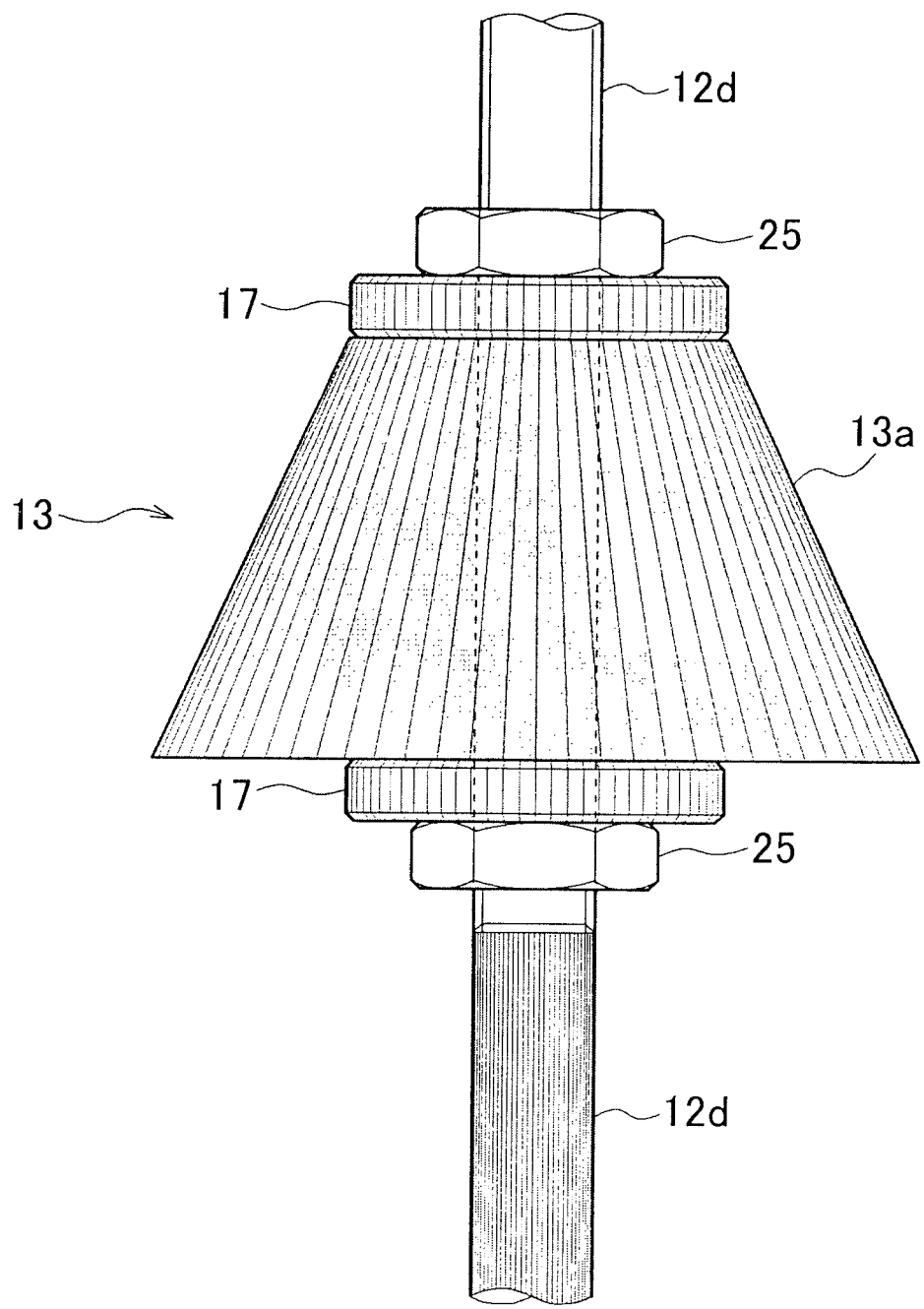
FIG. 7 is a partial side schematic diagram that illustrates a rotating roller constructing the socket.

The rotating roller 13 is a portion that inputs rotational force to the rotational shaft 12 and is formed with a circular-truncated-cone-shaped rubber member having a roller surface 13a which is inclined with respect to the axial direction. As shown in FIG. 7, the rotating roller 13 is pressed between generally disc-shaped plates 17, 17 that are positioned above and below the rotating roller 13 by the respective nuts 25 and is thereby placed in a prescribed position at the upper end 12d of the rotational shaft 12.

An inclination angle θ2 of the roller surface 13a of the rotating roller 13, which is shown in FIG. 5, is generally the same as an inclination angle θ1 of the inclined surface 6c of the rotating ring 6. That is, the roller surface 13a and the inclined surface 6c are generally parallel to each other. In the multi-axis temporary tightening tool 1, the inclination angle θ2 of the roller surface 13a and the inclination angle θ1 of the inclined surface 6c generally correspond with each other. Accordingly, when the rotating ring 6 is rotated while being pressed downward, the component of the downward pressing force in the direction orthogonal to the inclined surface 6c results in force such that the inclined surface 6c closely contacts with the roller surface 13a, thus certainly transmitting the rotational force input to the rotating ring 6 to the rotating roller 13 with no transmission loss.

In other words, in the multi-axis temporary tightening tool 1 according to the embodiment of the present invention, the inclined surface 6c where the rotating ring 6 and the rotating roller 13 contact with each other is formed to be inclined with respect to the axial direction of the rotating ring 6, and the inclination angle θ2 of the roller surface 13a where the rotating roller 13 and the rotating ring 6 contact with each other is generally the same as the inclination angle θ1 of the rotating ring 6 (inclined surface 6c). In such a configuration, the operational force (rotational force) applied to the rotating ring 6 is certainly transmitted to the rotating rollers 13, thereby allowing a simple and operable construction of the multi-axis temporary tightening tool 1.

Further, in the multi-axis temporary tightening tool 1 according to the embodiment of the present invention, the main body 2 includes the upper support ring 4 and the lower support ring 5 that rotatably support the rotational shaft 12 and the rotating ring 6 that is rotatably supported by the upper support ring 4 and the lower support ring 5. The main body 2 rotatably supports the rotational shaft 12 with the rotating roller 13 contacting with the rotating ring 6, transmits rotation of the rotating ring 6 to the rotating roller 13, and thereby rotates the rotational shaft 12. Such a configuration enables a construction of the multi-axis temporary tightening tool 1 having a ring shape with a simple mechanism.

As shown in FIG. 5, the engagement portion 14 is a generally cylindrical member formed of a material having magnetism (magnetic material) such as iron, engages with the nut 22 which is the screw member, and serves to transmit rotational force to the nut 22. A groove 14a is formed in a surface positioned at a lower end of the engagement portion 14 in its use state. The nut 22 engages in the groove 14a.

The width of the groove 14a is slightly larger compared to the width across flat of the nut 22 and is smaller compared to the width across corners of the nut 22. The groove 14a thereby locks on two corners of the nut 22. The width is selected so that the nut 22 fits into the groove 14a and once fitting into it certainly keeps their engagement state. In other words, the engagement portion 14 rotates around the rotational shaft 12 in a state where the nut 22 has fitted into the groove 14a, and the engagement portion 14 thereby applies rotational force to the nut 22.

Further, the positioning portion 18 protrudes downward in the groove 14a. The groove 14a constrains an outer periphery of the nut 22 fitted into the groove 14a, and the positioning portion 18 is fitted into an inner periphery (nut hole 22a) of the nut 22, thereby allowing precise positioning of the nut 22 engaged in the engagement portion 14.

As shown in FIG. 6, an inclination angle θ3 of the inclined surface 18a generally corresponds with an inclination angle θ4 of a tapered portion 22b formed in the nut hole 22a of the nut 22. The inclined surface 18a of the positioning portion 18 fitted into the nut hole 22a is placed along the tapered portion 22b, thereby allowing more precise positioning of the nut 22.

As shown in FIG. 5, the magnet 15 is placed above the engagement portion 14 to abut thereon. The magnet 15 magnetically holds onto the engagement portion 14 and thereby can magnetize the engagement portion 14 which is a magnetic material. Accordingly, the nut 22 which contacts with the engagement portion 14 can be magnetically held by the engagement portion 14. The magnetically holding force of the engagement portion 14 can be adjusted by varying the thickness of the engagement portion 14.

When the nut 22 is separated from the engagement portion 14 and contacts with only the positioning portion 18, the positioning portion 18 which is a non-magnetic material is not magnetized by the magnet 15, and the magnetically holding force of the magnet 15 is thus not exerted on the nut 22.

In other words, in the multi-axis temporary tightening tool 1 according to the embodiment of the present invention, the socket 3 includes the rotating roller 13 that is a roller portion to which rotating force is input from the main body 2, the rotational shaft 12 that supports the rotating roller 13, the engagement portion 14 that is formed with the magnetic material and engages with the nut 22 supported by the lower end 12e of the rotational shaft 12, and the magnet 15 that is placed to abut upon the engagement portion 14 and has the magnetically holding force. Such a configuration allows certain holding of the nut 22.

The spring 16 which is an elastic member is placed in a space above the magnet 15 inside the case 11. The spring 16 is, in a contracted state compared to its stationary length, inserted into a space defined by the case 11 and the magnet 15 and can constantly urge the magnet 15 and the engagement portion 14 downward with elastic force in the use state of the multi-axis temporary tightening tool 1. Accordingly, in the use state of the multi-axis temporary tightening tool 1, the nut 22 fitted into the groove 14a of the engagement portion 14 can be constantly pressed downward by the engagement portion 14.

Now, a multi-axis temporary tightening tool according to another embodiment of the present invention will be described with reference to FIG. 8. The multi-axis temporary tightening tool 1 (see FIG. 2) according to the embodiment of the present invention includes the main body 2 which is in a generally circular ring shape and is suitable for simultaneous temporary tightening of the plurality of nuts 22 to the assembly 21 in which the plurality of stud bolts 21a or the members on which the screw members are screwed are arranged in a generally circular shape along the ring shape.

However, depending on the shapes of assemblies and workpieces to be assembled, the stud bolts or the members on which the screw members are screwed may be arranged in a shape other than the generally circular shape. Accordingly, an embodiment of the multi-axis temporary tightening tool according to the present invention will be described which can handle with a case that the stud bolts or the members on which the screw members are screwed are arranged in a generally rectangular shape. In other words, the multi-axis temporary tightening tool according to the present invention may not only be embodied as the multi-axis temporary tightening tool 1 (see FIG. 2) that is generally circular and includes the ring-shaped main body 2, but also may be embodied as a multi-axis temporary tightening tool 31 that has a generally rectangular ring-shaped main body 32 as shown in FIGS. 8A and 8B.

Figure 8A:
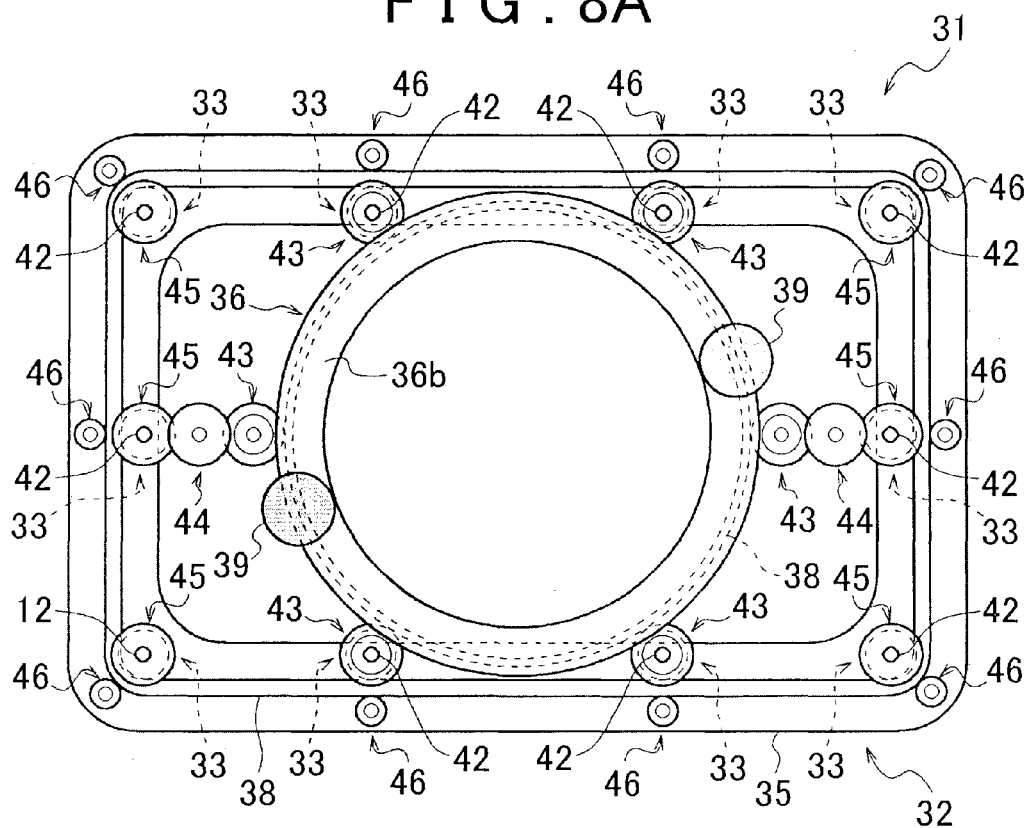
Figure 8B:
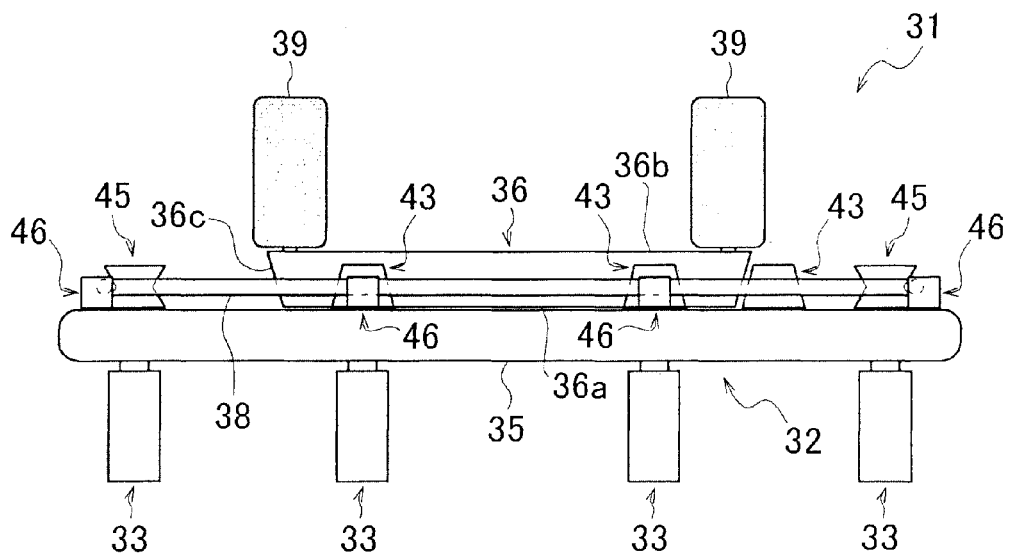

As shown in FIGS. 8A and 8B, the multi-axis temporary tightening tool 31 according to the other embodiment of the present invention includes a support ring 35 in a generally rectangular ring shape, the main body 32 formed with a generally circular rotating ring 36 and so forth, a plurality of sockets 33, and so forth. With the multi-axis temporary tightening tool 31, an operating personnel grips handlebars 39, 39, rotates the rotating ring 36 along a horizontal plane direction, and thereby can rotate each rotating roller 43 which frictionally contacts with a rubber ring 38 disposed on an inclined surface 36c of the rotating ring 36.

Each of the rotating rollers 43 is rotated to allow the rubber ring 38 surrounded by each of the rotating rollers 43 to rotate. Furthermore, the rotating rollers 43 are rotated to allow respective rotating roller 45 that contact with driven rollers 44 that contact with the rotating rollers 43 to rotate. The multi-axis temporary tightening tool 31 includes backup rollers 46 which are roller members that push the rubber ring 38 against the rotating rollers 43 and the rotating rollers 45 to further stabilize the rotation of the rubber ring 38.

Together with the rotation of each of the rotating rollers 43, each of rotational shafts 42 that are shafts that support the respective rotating rollers 43 can be rotated about its axis. Accordingly, engagement portions (not shown) in the respective sockets 33 are rotated together with the rotation of the respective rotational shafts 42. In such a configuration, even if the sockets are arranged in a shape other than generally circular, the rotation of the rotating ring 36 allows the engagement portions (not shown) in the respective sockets 33 to be rotated, and the multi-axis temporary tightening tool 31 can handle with an assembly in which the stud bolts or the members on which the screw members are screwed are arranged in a generally rectangular shape.

Next, a condition in use of the multi-axis temporary tightening tool 1 according to the embodiment of the present invention will be described with reference to FIGS. 9 to 16. When the multi-axis temporary tightening tool 1 is used to temporarily tighten the nuts 22 on the stud bolts 21a in an operation for attaching the workpiece 20 to the assembly 21, the nuts 22 are first loaded in the sockets 3.

In the operation for loading the nuts 22 at this point, the nuts 22 are arranged in positions in a generally circular shape corresponding to the arrangement of the sockets 3, and the multi-axis temporary tightening tool 1 is then arranged so that the sockets 3 are positioned right above the respective nuts 22.

The multi-axis temporary tightening tool 1 is thereafter displaced from a higher position to a lower position, thereby making the nuts 22 approach the respective engagement portions 14 in the sockets 3. Then, the engagement portions 14 having the magnetically holding force hold the respective nuts 22, and the nuts 22 are loaded in the respective sockets 3.

An operation for loading the washers 23 is conducted after the loading of the nuts 22 in the sockets 3. The washers 23 are first arranged in positions in a generally circular shape corresponding to the arrangement of the sockets 3, and the multi-axis temporary tightening tool 1 is then arranged so that the sockets 3 are positioned right above the respective washers 23.

The multi-axis temporary tightening tool 1 is thereafter displaced from a higher position to a lower position, and the washers 23 are fitted into respective recesses 11f formed in the cases 11. The magnetically holding force of the engagement portions 14 is allowed to act on the respective washers 23 via the nuts 22, thereby loading the washers 23 in the respective recesses 11f.

Next, in a state such that the nuts 22 and the washers 23 are loaded in the sockets 3, the multi-axis temporary tightening tool 1 is placed in a prescribed position of the workpiece 20 to attach. At this point, the multi-axis temporary tightening tool 1 is placed so that the sockets 3 are positioned right above the respective stud bolts 21a provided on the assembly 21. Further at this point, the contact portions 10a of the respective positioning stoppers 10 are placed along a prescribed position of the workpiece 20 (for example, positions α and β), and the multi-axis temporary tightening tool 1 can be thereby easily and precisely positioned with respect to the workpiece 20 (see FIGS. 1B and 3).

When the multi-axis temporary tightening tool 1 is placed, in the prescribed position of the workpiece 20, the protrusion 20a of the workpiece 20 can be entered into the cavity of the ring-shaped main body 2. Accordingly, the multi-axis temporary tightening tool 1 does not interfere with the workpiece 20.

In other words, the multi-axis temporary tightening tool 1 according to the embodiment of the present invention includes the main body 2 which is a tool main body and the plurality of sockets 3 placed in the main body 2, rotates the plurality of sockets 3 by the rotational force input to the main body 2, and thereby simultaneously applies rotational force to the plurality of nuts 22 which are the screw members. In the multi-axis temporary tightening tool 1, the main body 2 is formed into the ring shape, and the plurality of sockets 3 are arranged in the ring shape along the main body 2. Such a configuration allows application of the multi-axis temporary tightening tool 1 to a case that the stud bolts 21a or the portions to which the screw members are tightened are arranged around the protruding portion (protrusion 20a).

Figure 9:
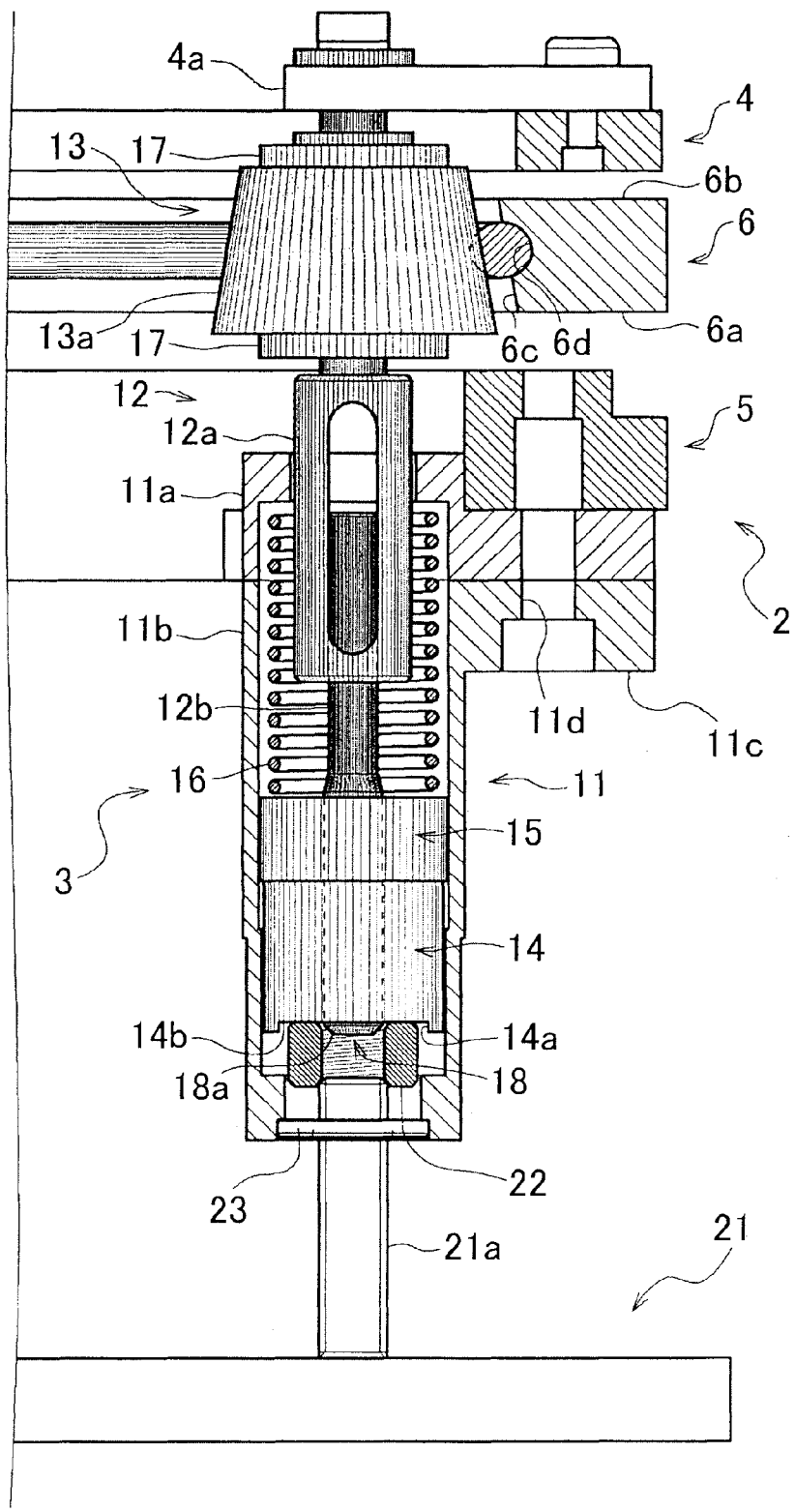
FIG. 9 is a partial cross-sectional schematic diagram that illustrates a condition in use (in arrangement in a prescribed position) of the multi-axis temporary tightening tool according to the embodiment of the present invention.
Figure 10A:
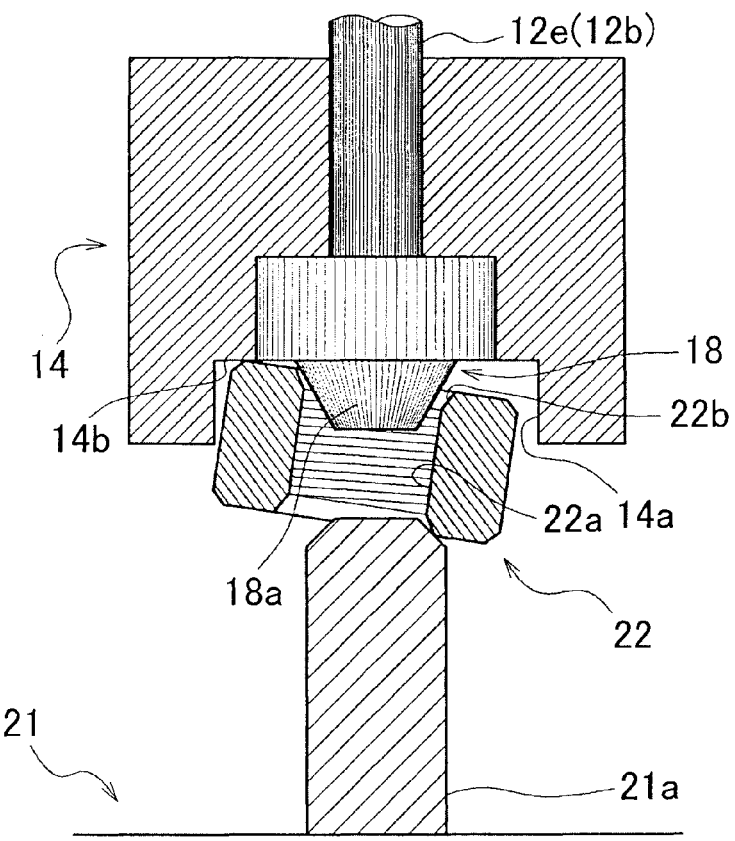
Figure 10B:
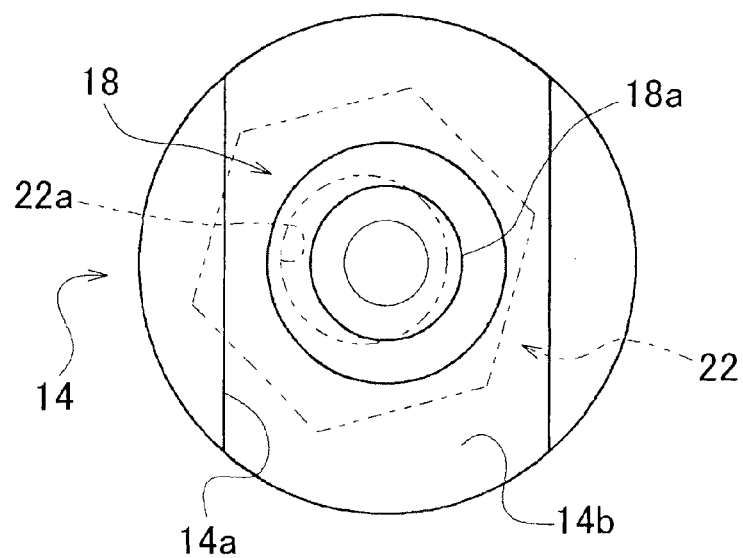

As shown in FIG. 9, when the multi-axis temporary tightening tool 1 is placed in the prescribed portion of the workpiece 20, the stud bolts 21a are inserted into the sockets 3 and press the engagement portions 14 via the nuts 22, and displace the engagement portions 14 and the magnets 15 against the elastic force with which the springs 16 urge them. At this point, the nuts 22 may fit into the grooves 14a of the engagement portions 14, or, as shown in FIGS. 10A and 10B, may not fit into the grooves 14a, but keep stuck on the positioning portions 18.

Figure 11A:
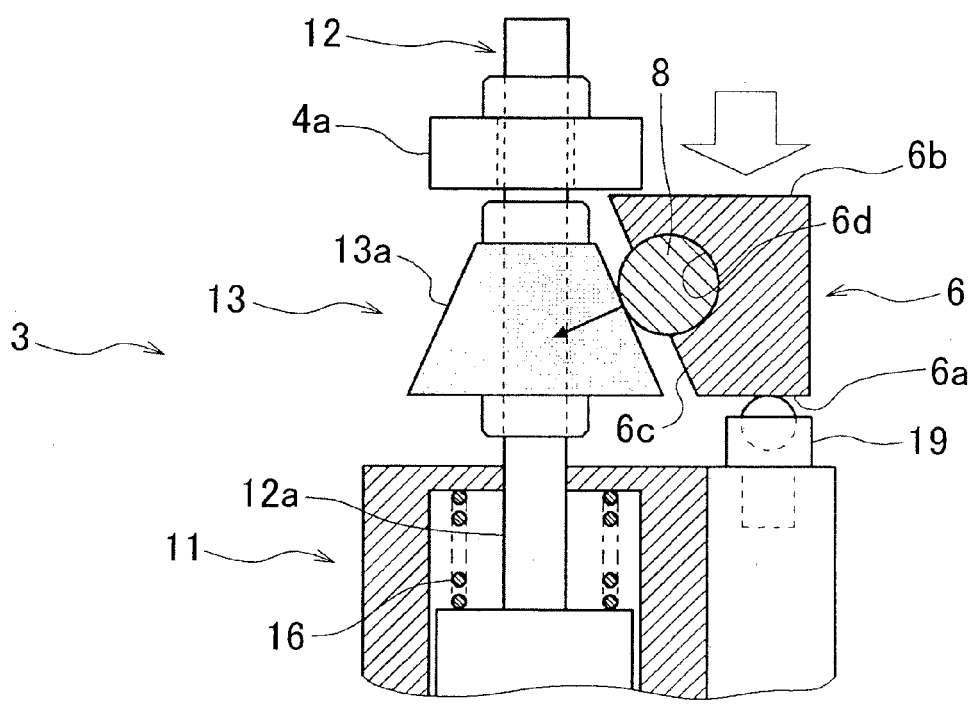
Figure 11B:
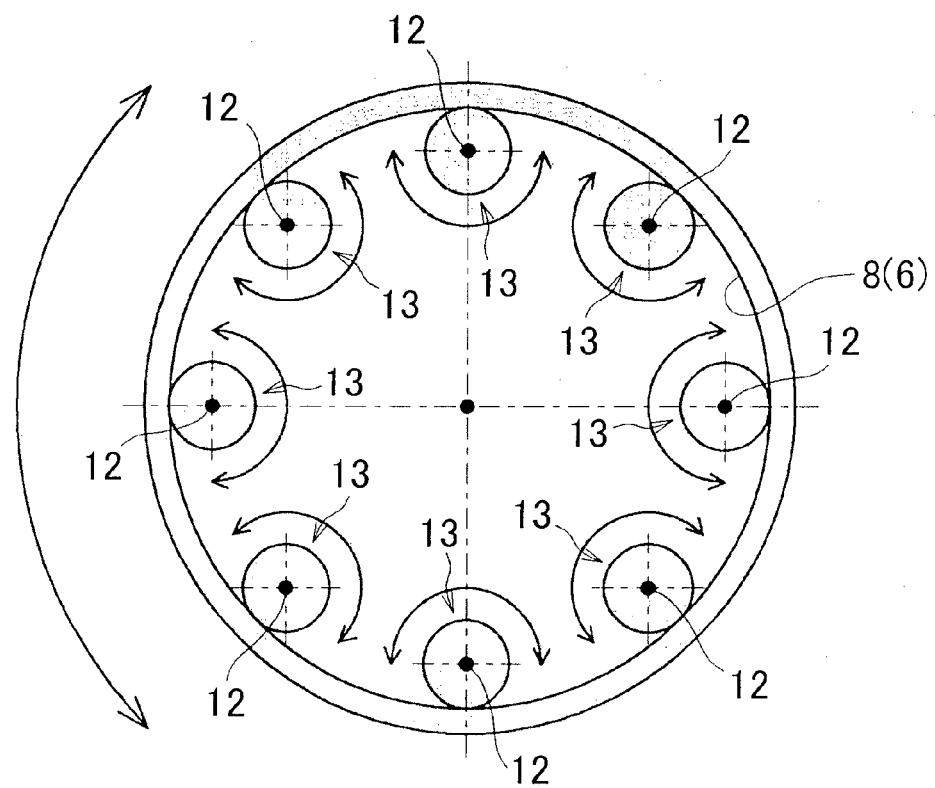

Next, the stoppers 9a of the handlebars 9 are released, and the rotating ring 6 is rotated by a prescribed rotational angle in the direction opposite to the tightening direction (see FIG. 2). As shown in FIGS. 11A and 11B, when the rotating ring 6 is rotated, the rubber ring 8 provided on the inclined surface 6c formed on the inside of the rotating ring 6 rotates. At this point, since the rotating rollers 13 contact with the rubber ring 8, the rotating rollers 13 rotate about the respective rotational shafts 12 as their axes according to the rotation of the rubber ring 8.

In other words, for example, when the rotating ring 6 (rubber ring 8) is rotated rightward (clockwise) in the horizontal plane, the plurality of rotating rollers 13 are simultaneously rotated rightward (clockwise). Then, the engagement portions 14 provided at the lower ends 12e of the rotational shafts 12 are simultaneously rotated rightward. Further, for example, when the rotating ring 6 (rubber ring 8) is rotated leftward (counterclockwise) in the horizontal plane, the plurality of rotating rollers 13 are simultaneously rotated leftward (counterclockwise). Then, the engagement portions 14 provided at the lower ends 12*e* of the rotational shafts 12 are simultaneously rotated leftward.

Here, when the positions and arrangement of the nuts 22 are corrected, the nuts 22 are rotated in the direction opposite to that of screwing on the stud bolts 21*a*. In this embodiment, the rotating ring 6 is rotated counterclockwise.

Figure 12A:
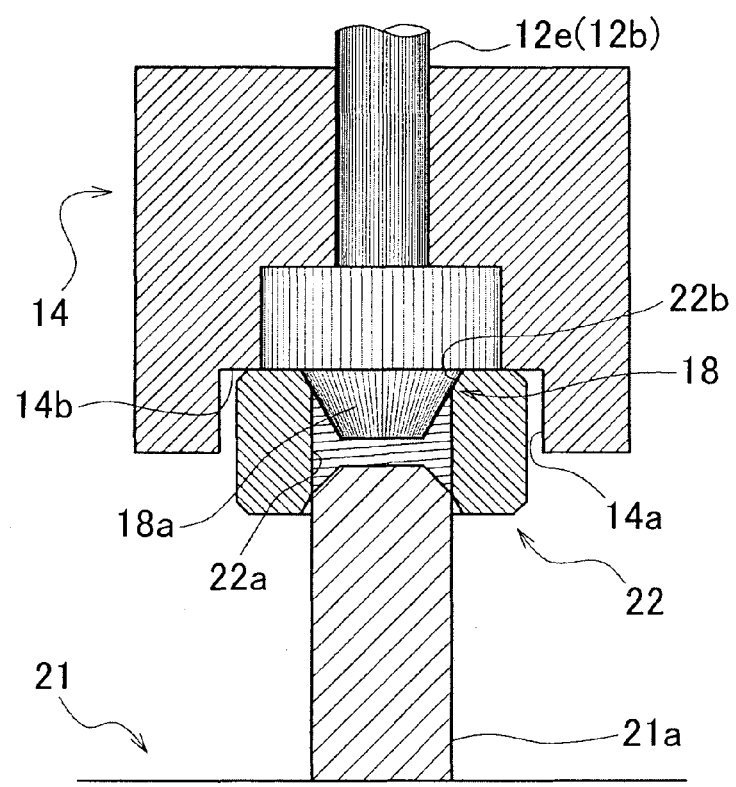
Figure 12B:
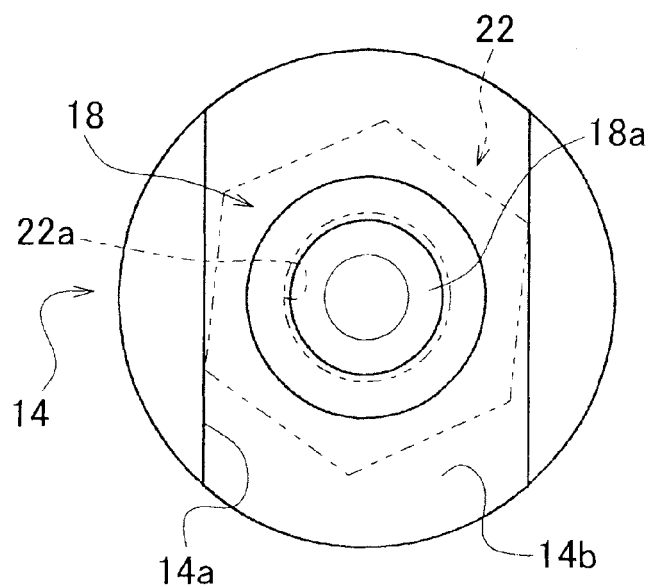

Accordingly, the nuts 22 that have not fit into the grooves 14*a*, but have stuck on the positioning portions 18 are pressed by the grooves 14*a* and are, as shown in FIGS. 12A and 12B, shortly corrected into positions fitted into the grooves 14*a*. Further at this point, since the positioning portions 18 protruding from the grooves 14*a* fit into the nut holes 22*a* of the nuts 22 that have fitted into the grooves 14*a*, the arrangement of the nuts 22 is corrected into the positions where the axes of the nuts 22 and the respective engagement portions 14 correspond with each other.

Figure 13:
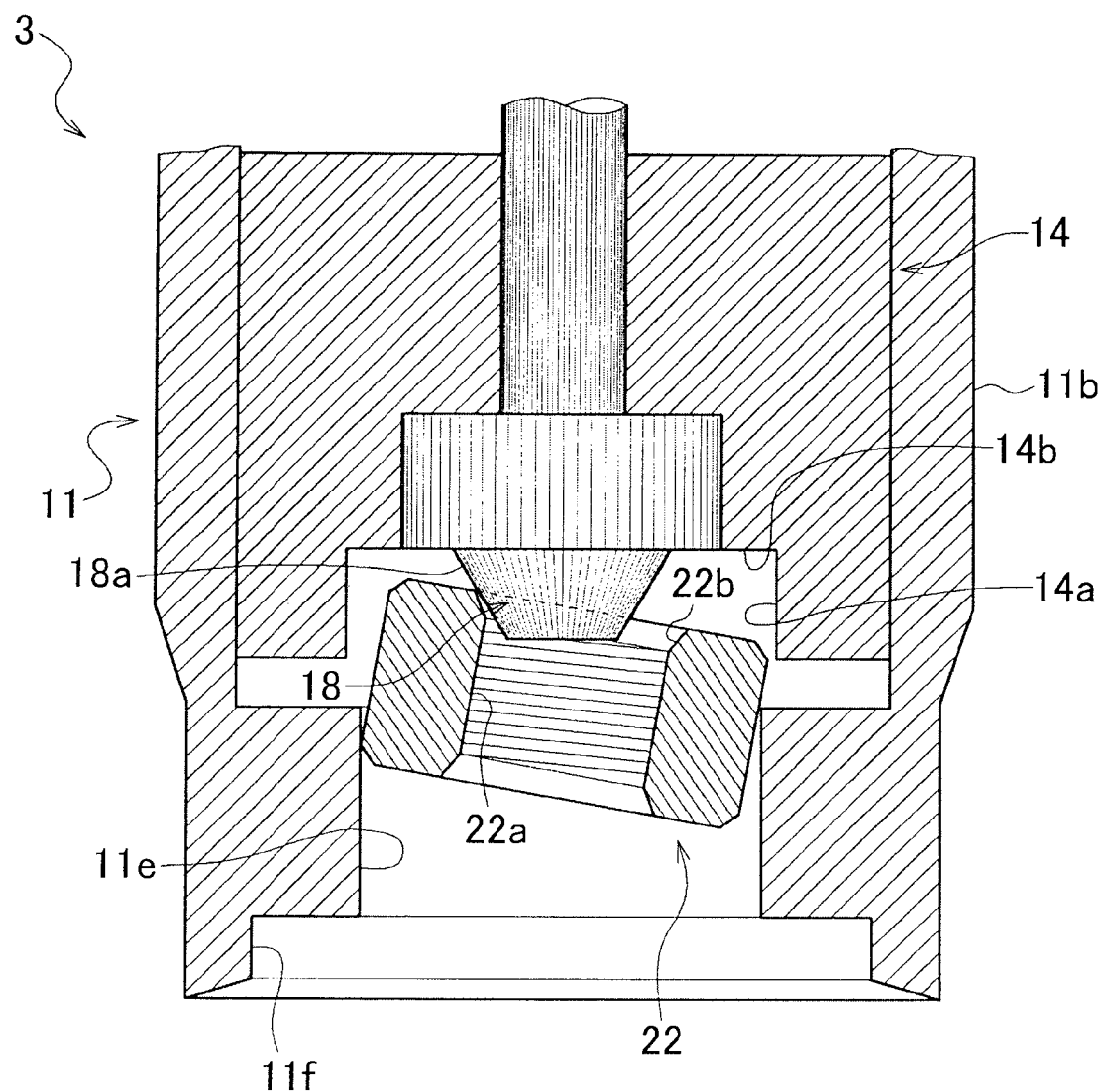
FIG. 13 is a side cross-sectional schematic diagram that illustrates the engaged state of the nut in the socket.

As shown in FIG. 13, in the range in the axial direction in which the nut 22 is placed in the case 11, the case 11 has a reduced diameter portion 11*e* whose inner diameter is reduced to a slightly larger size compared to the size of the nut 22. The reduced diameter portion 11*e* restricts offset of the nut 22. The inner diameter of the reduced diameter portion 11*e* is formed smaller than the outer diameter of the engagement portion 14. As described above, the engagement portions 14 are once rotated in the rotational direction opposite to the tightening direction, thereby allowing correction of the positions and arrangement of the nuts 22 into the positions and arrangement such that they can be certainly screwed onto the stud bolts 21*a*.

Figure 14:
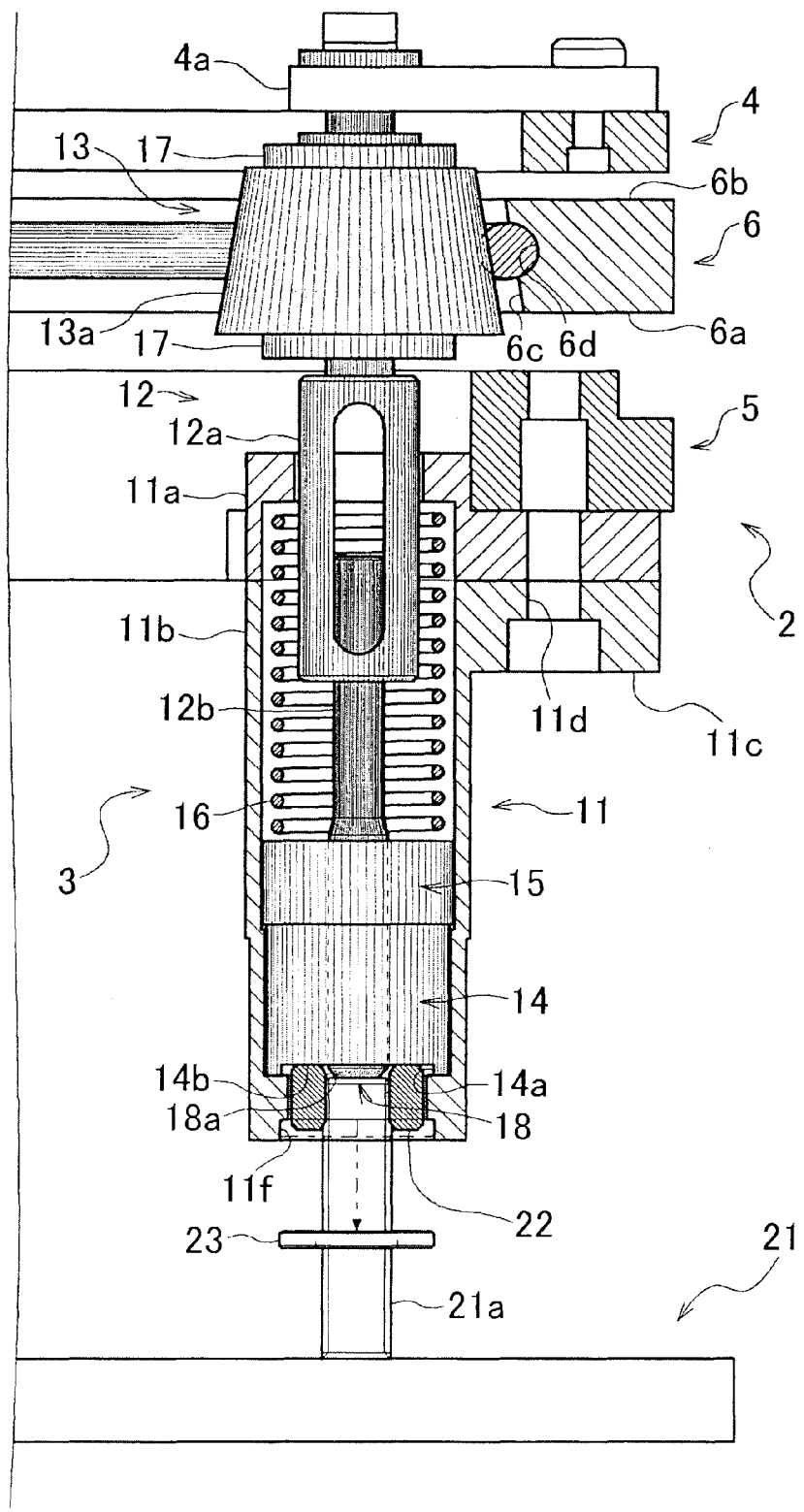
FIG. 14 is a partial cross-sectional schematic diagram that illustrates a condition in use (while the temporary tightening is in progress) of the multi-axis temporary tightening tool according to the embodiment of the present invention.

Next, the rotating ring 6 is rotated by a prescribed rotational angle in the direction corresponding to the tightening direction. Here, to screw the nuts 22 on the stud bolts 21*a*, the nuts 22 are required to rotate clockwise. Accordingly, when the nuts 22 are temporarily tightened, the rotating ring 6 is rotated clockwise. As shown in FIG. 14, this applies rotational force to the nuts 22 engaged in the grooves 14*a* of the engagement portions 14. The nuts 22 rotate clockwise and are screwed onto the stud bolts 21*a*. Further at this point, the washers 23 are pressed by the nuts 22, released from the recesses 11*f*, and provided to the stud bolts 21*a*.

The screwing amount of the nut 22 (how many threads the nut is temporarily screwed on the stud bolt) depends on the rotational speed of the rotating roller 13. However, the outer diameter of the portion of the rotating roller 13 which contacts with the rubber ring 8 is adjusted, and the screwing amount of the nut 22 can be thereby adjusted. In other words, when the inner diameter of the rubber ring 8 and the rotational angle of the rotating ring 6 are constant, reducing the outer diameter of the rotating roller 13 can increase the rotational speed of the rotating roller 13, and increasing the outer diameter of the rotating roller 13 can reduce the rotational speed of the rotating roller 13.

Figure 15:
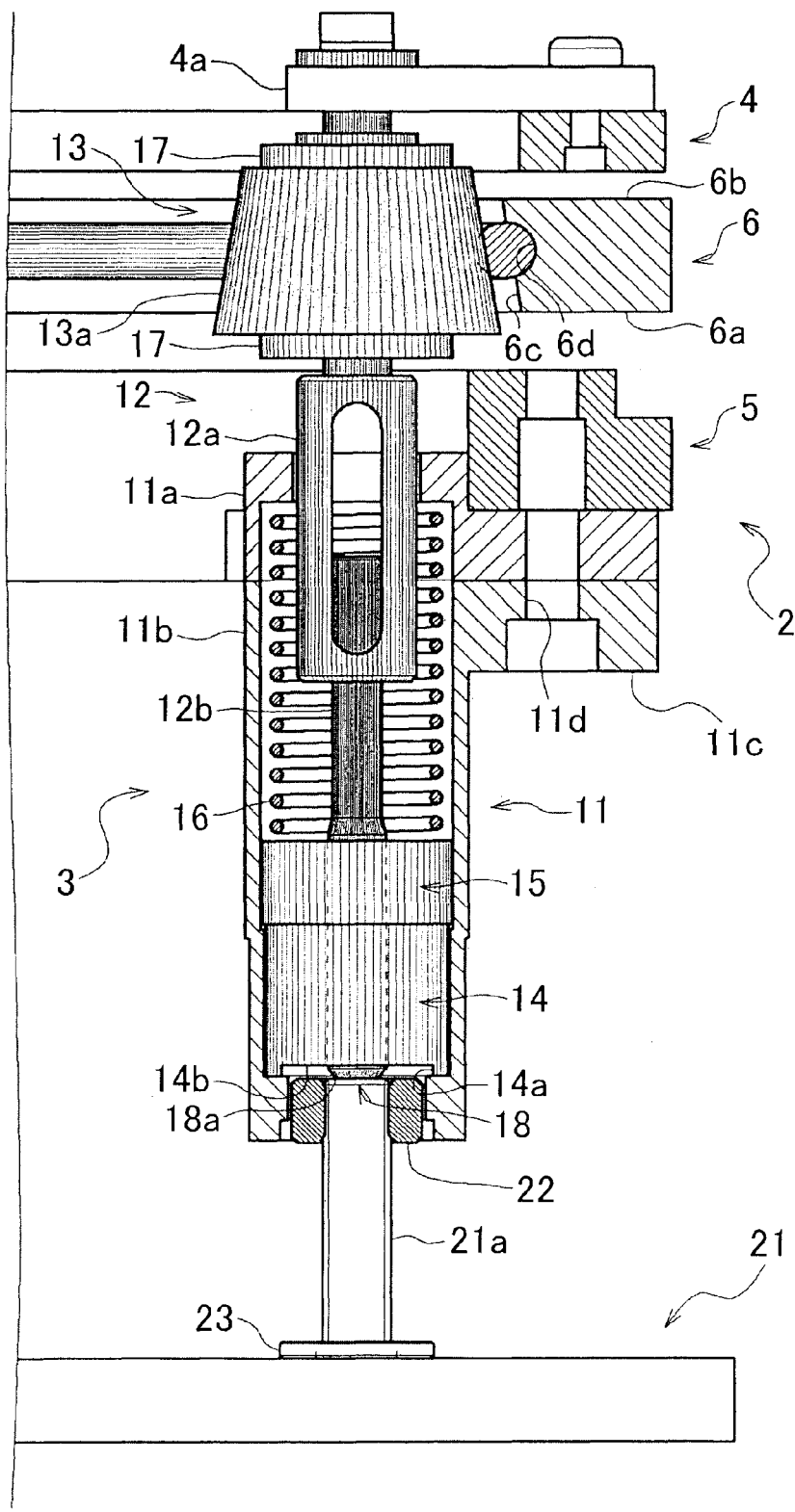
FIG. 15 is a partial cross-sectional schematic diagram that illustrates a condition in use (when the temporary tightening is completed) of the multi-axis temporary tightening tool according to the embodiment of the present invention.
Figure 16:
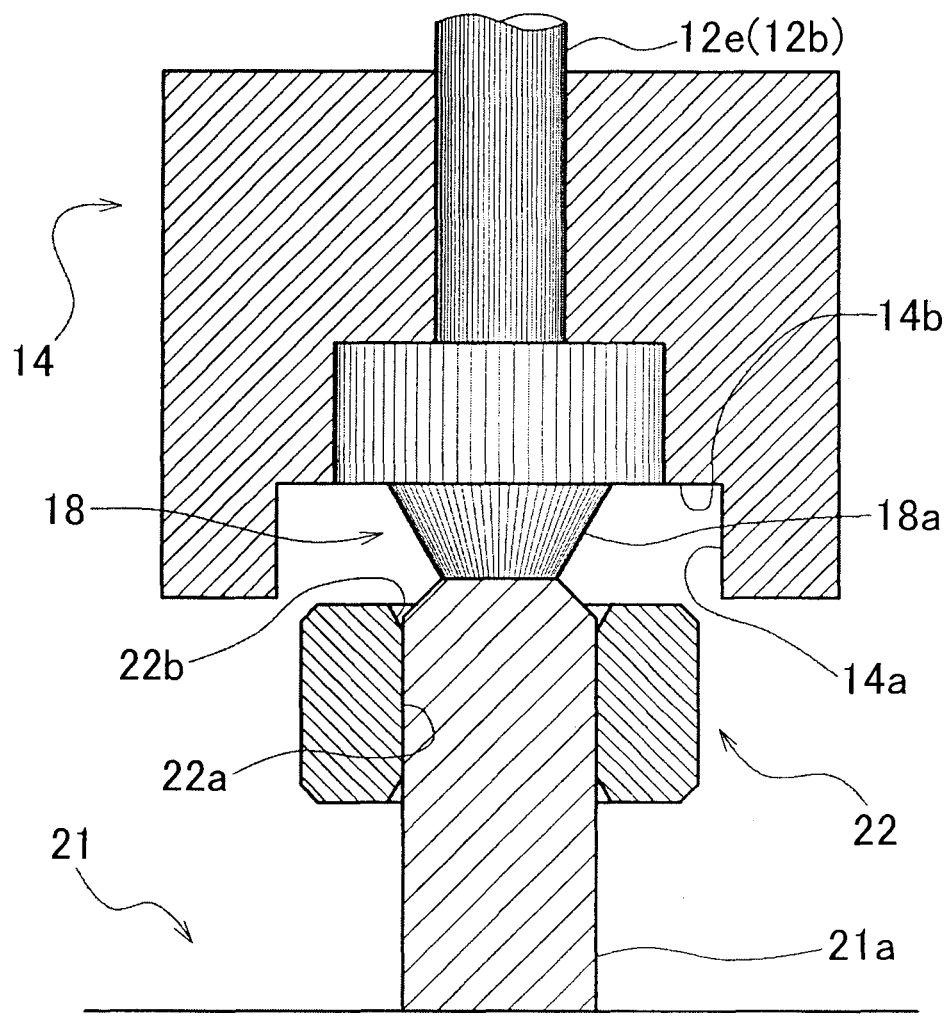
FIG. 16 is a side cross-sectional schematic diagram that illustrates a state where the nut is disengaged with the engagement portion at completion of the temporary tightening.

As shown in FIG. 15, as the screwing further progresses and the nut 22 moves down, the nut 22 moves away from a bottom 14*b* of the groove 14*a*, and the magnetically holding force gradually decreases. When the screwing progresses yet further, as shown in FIG. 16, the nut 22 is shortly screwed to the stud bolt 21*a* to a position where the nut 22 is disengaged with the positioning portion 18.

At this point, the portion that remains in contact with the nut 22 or the stud bolt 21*a* until the last phase is the positioning portion 18. However, since the positioning portion 18 is formed of the non-magnetic material, when the screwing is complete, the magnetically holding force of the magnet 15 does not act on the stud bolt 21*a* or the nut 22.

Accordingly, when the multi-axis temporary tightening tool 1 is removed from the workpiece 20, the magnetically holding force of the magnet 15 is not exerted thereon, thus allowing reduction in force required for the removal.

In other words, in the multi-axis temporary tightening tool 1 according to the embodiment of the present invention, the socket 3 forms the lower end 12*e* of the rotational shaft 12 and includes the positioning portion 18 that is formed of the non-magnetic material and positions the nut 22 protruding from the engagement portion 14. Such a configuration allows reduction in the operational force required when the multi-axis temporary tightening tool 1 is removed from the workpiece 20 after the temporary tightening.

As described above, in the multi-axis temporary tightening tool 1 according to the embodiment of the present invention, the operating personnel rotates the rotating ring 6 (that is, the rubber ring 8), and the plurality of rotating rollers 13 frictionally contacting with the rubber ring 8 are thereby operably rotated. Such a simple device configuration facilitates rotation of the plurality of sockets 3 (more specifically, the engagement portions 14). Furthermore, the multi-axis temporary tightening tool 1 according to the present invention does not require a driving source such as a motor and has a simple configuration with a light weight. This allows low cost manufacture of the multi-axis temporary tightening tool 1 which the operating personnel can easily handle with.

The invention claimed is:

1. A multi-axis temporary tightening tool comprising:
a tool main body formed into a ring shape; and
a plurality of sockets which are arranged in a ring shape along the tool main body, are rotated by rotational force input to the tool main body, and simultaneously apply rotational force to a plurality of screw members that are engaged in the sockets,
wherein each socket of the plurality of sockets comprises:
a roller that is a portion to which the rotational force is input from the tool main body;
a rotational shaft that supports the roller;
an engagement portion which is formed of a magnetic material and engages with the screw member supported by one end of the rotational shaft; and
a magnet which is placed to abut upon the engagement portion and has magnetically holding force,
wherein the tool main body comprises:
a support ring that rotatably supports the rotational shafts, and
a rotating ring that is rotatably supported by the support ring, an inner circumferential surface of the rotating ring being configured to impart the rotational force upon the sockets,
wherein the rollers rotatably support the rotational shafts while the rollers are coupled to the rotating ring, rotation of the rotating ring is transmitted to the rollers, and the rotational shafts rotate,
wherein the inner circumferential surface of the rotating ring is coupled to the rollers and is formed to incline with respect to an axial direction of the rotating ring,
wherein surfaces of the rollers which are coupled to the rotating ring are formed to incline with respect to an axial direction of the rollers,
wherein inclination angles of the surfaces of the rollers which are coupled to the rotating ring are generally the same angles as an inclination angle of the inner circumferential surface of the rotating ring which is coupled to the rollers, and wherein the sockets are arranged entirely on the inside of the inner circumferential surface of the rotating ring.

2. The multi-axis temporary tightening tool according to claim 1, wherein the socket includes a positioning portion which is formed at the one end of the rotational shaft, protrudes from the engagement portion, positions the screw member, and is formed of a non-magnetic material.

3. A multi-axis temporary tightening tool comprising:
a tool main body formed into a ring shape; and
a plurality of sockets which are arranged in a ring shape along the tool main body, are rotated by rotational force input to the tool main body, and simultaneously apply rotational force to a plurality of screw members that are engaged in the sockets,
wherein each socket of the plurality of sockets comprises:
a roller that is a portion to which the rotational force is input from the tool main body,
a rotational shaft that supports the roller, and
an engagement portion which is formed of a magnetic material and engages with the screw member supported by one end of the rotational shaft;
wherein the tool main body comprises:
a support ring that rotatably supports the rotational shafts, and
a rotating ring that is rotatably supported by the support ring,
wherein the rollers rotatably support the rotational shafts while the rollers are coupled to the rotating ring, rotation of the rotating ring is transmitted to the rollers, and the rotational shafts rotate,
wherein a surface of the rotating ring which is coupled to the rollers is formed to incline with respect to an axial direction of the rotating ring,
wherein surfaces of the rollers which are coupled to the rotating ring are formed to incline with respect to an axial direction of the rollers, and
wherein inclination angles of the surfaces of the rollers which are coupled to the rotating ring are generally the same angles as an inclination angle of the surface of the rotating ring which is coupled to the rollers.

\* \* \* \* \*